United States Patent

Hill

[11] 3,958,528
[45] May 25, 1976

[54] PRODUCT THAW INDICATOR

[76] Inventor: Robert Hill, 150 Robin Way, Los Gatos, Calif. 95030

[22] Filed: June 23, 1975

[21] Appl. No.: 589,362

Related U.S. Application Data

[63] Continuation of Ser. No. 408,555, Oct. 23, 1973.

[52] U.S. Cl. ............................................. 116/114.5
[51] Int. Cl.² ....................................... G01K 11/06
[58] Field of Search.................... 116/114.5; 73/358

[56] References Cited
UNITED STATES PATENTS

| | | | |
|---|---|---|---|
| 2,614,430 | 10/1952 | Ballard et al. | 73/358 |
| 3,177,843 | 4/1965 | Geocaris | 116/114.5 |
| 3,414,415 | 12/1968 | Broad | 116/114.5 |
| 3,665,770 | 5/1972 | Sagi et al. | 116/114.5 |

Primary Examiner—James J. Gill
Assistant Examiner—Anthony V. Ciarlante
Attorney, Agent, or Firm—C. Michael Zimmerman

[57] ABSTRACT

A device is described for indicating the thermal history of a product, i.e., whether or not such product has thawed and then been refrozen. The device includes a housing which is secureable in good thermal contact to the exterior of a package containing a frozen product. The walls of such housing insulate the same from the environment surrounding the package, while at the same time assuring good thermal contact between such interior and the product within the package. A closed membrane is positioned within the housing for containing a diffusion agent, and a wickable material extends from such membrane to a plurality of transparent windows in the wall of the housing. A dam extends across the wickable material to separate the closed membrane from such windows in a manner controlling diffusion of the diffusion agent through the wickable material.

14 Claims, 5 Drawing Figures

PRODUCT THAW INDICATOR

This is a continuation of application Ser. No. 408,555, filed on Oct. 23, 1973.

BACKGROUND OF THE INVENTION

This invention relates to a device for indicating whether or not a product has ever exceeded a predetermined temperature, and, more particularly, to such a device which is quite inexpensive in use and reliable, but does not require special handling prior to its association with a product which is to be monitored.

It is common practice in the food and medical industries, for example, to store perishables by freezing them until such time as they are to be used. For example, a significant part of any modern grocery store is devoted to frozen vegetables, juices, dinners, etc. It is also common to store blood plasmas in a frozen condition, and many vaccines are stored at reduced temperature.

It will be recognized that the unthawing or elevation of the temperature of a product prior to the time it is to be used, can affect the quality of such product. This is especially true of frozen unsterilized products, which normally contain bacteria and certain enzymes which cause deleterious changes to the product once it becomes unthawed. Unwanted thawing can occur during handling of a product. Such thawing and consequent product deterioration is often not detectable by the ultimate user of the product because of later refreezing. It will be recognized that use of a product, such as a blood plasma, certain foods and vaccines, after such undetected thawing or temperature elevation can have grevious results.

Because of the thawing-refreezing and temperature elevation problems, much effort has been devoted to providing a simple, effective and reliable means for indicating the thermal history of a product to a potential user so that assurance can be had that the product has not at any time attained such an elevated temperature that its quality is adversely affected. The paper entitled "Defrost Indicators" appearing in *Food Technology*, Vol. 26, pp. 46–50 (1972) provides a comprehensive list of patents and references setting forth the state of the art on this problem, with particular emphasis on frozen food thaw indicators. As pointed out in said paper, many thaw indicators have been designed in the past, and some have even been commercially produced and marketed. However, the ideal indicator does not exist, and none of those designed to date have been commercially successful.

Presently available thermal history indicators generally either require modification of the existing package for the frozen product so that the indicator can have access to the interior of the product while at the same time enabling checking from the exterior of such package, or merely measure the surface temperature of the product. Modification of the package is generally too expensive and cumbersome to be acceptable to the industry, and measurement of the surface temperature of the product is often not reflective of the state of the product as a whole. Because of such, neither approach is satisfactory. Another major difficulty with most present indicators emanates from the fact that they rely on the thawing of an indicating substance of one sort or another for their operation. Special handling has, therefore, been necessary during fabrication and later storage of the majority of such devices to assure that the indicating substance remains frozen, or such devices must be fabricated immediately prior to being applied to the product. While some devices include a membrane for containing the indicating substance, which membrane breaks to release the substance when the substance is frozen, such devices have not been reliable. That is, freezing may not always cause the membrane to break and release the diffusion agent. These problems have contributed to the reluctance of industry to adopt such devices.

SUMMARY OF THE INVENTION

The present invention provides a thermal history indicator for products which is not subject to the above difficulties and problems. In its basic aspects, the indicator of the invention includes a housing having an indication area, such as a transparent window, at a first location therein. A reservoir for a diffusion agent is positioned within such housing at a second location spaced from the first location, and a wick extends between such first and second locations. The diffusion agent is one which is capable of diffusion through the wick between the reservoir and the indication area only when the temperature of such agent is above a prescribed temperature, i.e., the diffusion agent is either frozen or sufficiently viscous when it is below such temperature to prevent significant diffusion. Means are provided for securing the housing to the exterior of a product in good thermal contact therewith, and means are associated with such housing for insulating the diffusion agent from the ambient temperature around the product. Thus, although the device is designed for securance to the exterior of a product, such device is adapted to reduce or entirely eliminate the effects of the package environment on its operation. In this connection, most desirably the housing includes a wall portion which is adjacent the diffusion agent therewithin and in thermal contact with the product when the housing is secured thereto. Such wall is of a good thermal conducting material in order to convey the thermal condition of such product into the housing for reaction with the diffusion agent. The means for insulating the diffusion agent from the ambient temperature around the product preferable includes a heat reflective surface, such as that provided by aluminum foil, at the wall of the housing which is exposed to the ambient temperature.

As another feature of the invention, it enables fabrication and storage for extended periods of time without the necessity of the diffusion agent being frozen. To this end, the reservoir is most desirably a closed membrane which completely contains the diffusion agent but which is rupturable from exteriorly of the housing to release the diffusion agent therefrom for contact with the wick. Thus, the device can be fabricated and stored for extended lengths of time prior to the time it is desired to utilize the same. More importantly, because breaking of such membrane is performed as an intentional act from the exterior of the housing, such breaking is assured.

As another salient feature, the preferred embodiment of the invention includes, in addition to a rupturable reservoir, means for controlling the passage of the indicating fluid from the reservoir to the indication area between such time that the reservoir is broken and the indicating substance is frozen with the package. More particularly, a dam is provided across the wick at a location between the reservoir and the indication area for controlling diffusion of such agent. Such dam is most simply made by providing a portion of such wick of increased density to reduce the time rate of diffusion of such agent through the portion. It should be noted that such dam is also useful for providing a control on the length of time that the diffusion agent must be thawed prior to the device providing an indication that the product may have deteriorated more than an acceptable amount.

The invention includes other features and advantages which will become apparent from the following, more detailed description of a preferred embodiment.

BRIEF DESCRIPTION OF THE DRAWING

With reference to the accompanying single sheet of drawing.

DETAILED DESCRIPTION OF PREFERRED EMBODIMENTS

Figure 1:
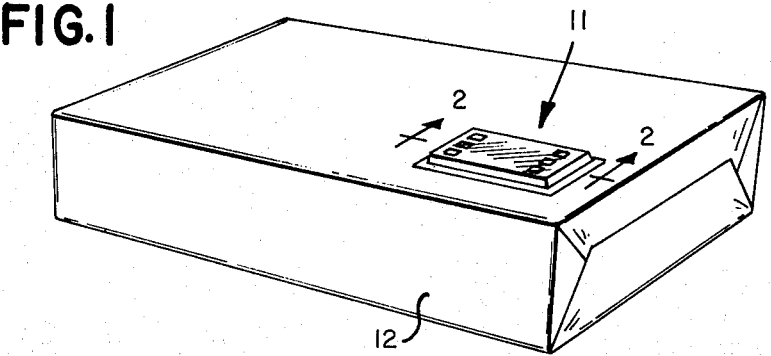
FIG. 1 is a perspective view showing a preferred embodiment of a device of the invention secured to a package of a frozen product, e.g., a food.
Figure 2:
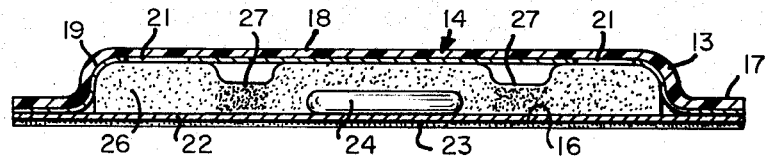
FIG. 2 is an enlarged sectional view of the device of the invention illustrated in FIG. 1, taken on a plane indicated by the lines 2—2 in FIG. 1, and illustrating its make-up.

With reference first to FIGS. 1 and 2 of the accompanying drawings, a device of the invention is generally indicated by the reference numeral 11 secured to the exterior surface of a package 12 of, for example, a frozen food. The device 11 includes an enclosure or housing 13 defined by upper 14 and lower 16 sheets of material which are peripherally secured together as illustrated at 17.

Means are associated with the housing 13 for insulating the interior of the same from the ambient temperature around the product to which it is secured. That is, the wall 14 is defined by a lamination of an outer layer 18 of a transparent plastic material and an inner layer 19 providing heat reflection. The layer 18 is most desirably of a synthetic plastic material having good heat insulating qualities, such as a cellulosic, polyamide, polycarbonate, polyester, polyolefin, polyvinylchloride, polystyrene, or copolymers thereof. Such layer 18 will thus isolate the interior of the package and the layer 19 from direct thermal contact with the package environment. In this connection, it is desirable that the layer 18 be relatively thick, e.g., 20 mils.

The layer 19 is, for example, an aluminum foil or other metal foil providing a heat reflective surface at the interior side of the transparent layer 18. Such layer will thus prevent radiation through the plastic layer 18 from heating the interior of the housing. However, the layer 19 has removed sections providing light transmitting windows 21 through the housing at specific locations as illustrated. The purpose of such windows will be described in detail hereinafter.

The bottom wall 16 of the housing has a generally flat configuration which conforms to the surface of the package. In addition, such wall includes a layer 22 of a metal foil or the like providing good thermal conduction between the interior of indicator housing and the food package, and as coating or layer 23 of a suitable adhesive is provided on the underneath side of layer 22. Such adhesive will provide securance of the housing 13 to the package over the full surface area of such metal foil layer 22 for good thermal conduction therebetween. In this connection, the foil providing the layer 22 can be of the same material providing the layer 19 of the wall 14. It is because transfer of heat from the package to the housing will be primarily via conduction, whereas transfer of heat from the surrounding environment to the package will be by radiation, that an aluminum foil is capable of functioning both as insulation for the wall 14 and a thermal conductor for wall 16.

A reservoir 24 for a diffusion agent is provided within the housing 13 at a location spaced from the windows 21. Such reservoir is formed by a closed, thin walled membrane of a flexible but inelastic material which can be ruptured from exteriorly of the housing to release a liquid diffusion agent contained therein. As shown, such membrane is centrally located within the housing, whereas the windows 21 are positioned adjacent the side edges of such housing. A wick for transferring the diffusion agent when it is not frozen, from the reservoir to the vicinity of the windows is also included. More specifically, the remainder of the interior of the housing is filled with a generally porous material. The exact nature of such material will depend upon its relationship with the chosen diffusion agent, i.e., for wicking action, the diffusion agent must wet such material. A cellulosic absorbent, such as that from which Whatman filter papers are made, is wetable by most liquids used as diffusion agents in devices of this nature and is otherwise suitable for use with the present invention.

From the above, it will be recognized that once reservoir 24 is broken to release the diffusion agent, such diffusion agent, when it is in liquid form, will be transmitted by the wick material 26 to locations underneath the windows 21. The time required for the diffusion agent to pass from the reservoir to the indication areas beneath the windows will depend upon the natures of the diffusion agent and the cellulosic material. Thus, by appropriately choosing the diffusion agent and the material for the wick, the thermal condition to which the product must be subjected before an indication of such will be given at the windows 21 can be selected.

As discussed previously, one problem which has precluded many prior indicators from being adopted is that they must be fabricated and stored at temperatures below the freezing point of the diffusion agent so that false indications are not given. As a particularly salient feature of the present invention, it includes means which overcomes this problem. More particularly, not only is the diffusion agent maintained out of contact with the wick material by the unruptured membrane until such time as the device is to be used, but the device also includes means which assures that even after rupture of the membrane, diffusion of the agent through the wick is prevented for a selected period of time sufficient to enable the device to be applied to a package and then frozen. To this end, dams 27 are provided in the wick separating the reservoir and the windows 21 on each side of the device. As best illustrated in FIG. 2, each dam 27 is simply a portion of the wick material of increased density to reduce the time rate of diffusion of the agent through such portion. When the wick material is of a relatively inelastic cellulosic absorbent, for example, the dam can be provided merely by compressing the material as indicated for such increased density. The degree of compression or increased density will depend upon the nature of the wick material and the time delay desired. The diffusion agent can be any of the liquid materials normally used for such purpose, and flowable through the selected wick material at the desired temperature. A preferred material for use as a diffusion agent when it is desired to know whether or not a product, such as a vaccine or a plasma, has been subjected to a temperature greater than −20° C for a predetermined period of time is corn oil. If the product is a frozen food, for example, which will deteriorate if subjected to a temperature greater than 0° C for a predetermined period of time, a preferred indicating material is palmitoleicacid. Jojoba Wax is a suitable diffusion agent for use when it is desired to know when a product has been subjected to a temperature greater than 10°C for more than a predetermined period of time. Of course, a color additive is desirably added to the chosen diffusion agent to provide a suitable visually detectable contrast at the windows 21 when the diffusion agent has reached the same. Visual indication can also be obtained at the windows 21 by providing a color or indicia signifying thawing on the interior side surface of the wall 16 directly below the windows 21 but covered by the wick material. If the wick is relatively thin, e.g., 10 mils, at such location and is of a good grade of a cellulosic absorbent such as that from which Whatmann filter papers Nos. 1 and 3 are made, the above and other diffusion agents will cause the same to become translucent at the windows 21. Such translucency will then expose the indicating color or indicia on the interior side surface of the wall 16 to provide the desired visible indication of the thermal history of the product.

It will be recognized that not only should the wall 13 of the device isolate the diffusion agent from the temperature of the surrounding environment, but it is also important that the effect on the surface of the product of such environment not detrimentally affect operation of the device. In this connection, it is not unusual for the surface of a package to be at a much higher temperature than the product contained therein. The device of the invention is designed to assure that the surface temperature of the package does not cause erroneous operation of the device. That is, the housing of the device will insulate from the temperature of the environment that portion of the package surface which it covers, and there is a substantial distance between the location at which the diffusion agent is normally located within the housing, i.e., between the dams 27, and the edges of such housing. Because of such, the device not only directly insulates the diffusion agent from the environment, but also reduces to an insignificant amount, transfer of thermal energy from the surface of the package not covered by the device, to the location at which the diffusion agent is in close thermal contact with the package.

Figure 3:
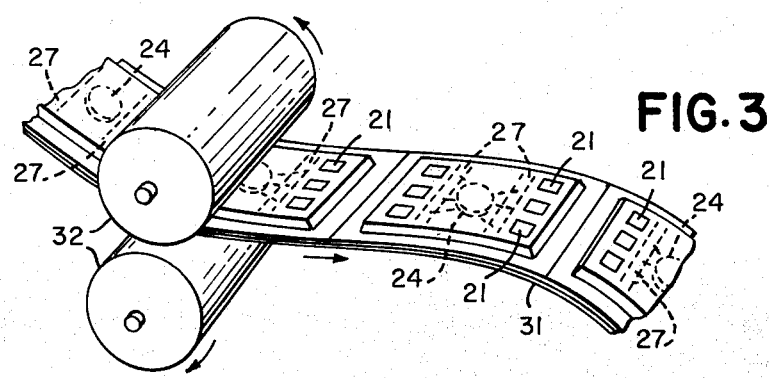
FIG. 3 illustrates a section of a continuous tape of devices of the invention, passing between rollers for breaking the diffusion fluid reservoir of each device from the exterior of such device.

The thermal indicator of the invention readily lends itself to fabrication, storage and application to a product. More particularly, the device can be made by laminating together the various materials without requiring extensive modification of machinery presently available. Moreover, a plurality of such devices can be made simultaneously in a sheet or web material. In this connection, FIG. 3 illustrates a plurality of indicators of the invention provided on a continuous backing strip 31. Such strip is, for example, a silicone treated easily peelable strip upon which the devices are adhered by laminating at the time of manufacture. It will be recognized that not only does the utilization of such strip protect the adhesive layer 23 on the underneath side of each of the devices, but it also enables a plurality of such devices to be provided in a convolute roll form or the like.

As mentioned previously, a major advantage of the instant invention is that it is quite reliable, although it may be fabricated and stored at normal temperatures. That is, with proper processing one is assured that the device is activated, i.e., that the diffusion agent is released, at the time it is applied to a product to be frozen. FIG. 3 further illustrates an arrangement for simply and effectively activating the devices. More particularly, a pair of pressure nip rollers 32 are provided, between which the strip of material 31 is passed immediately prior to the time it is desired to apply indicators of the invention to packages of a product.

As schematically illustrated, such nip rollers apply sufficient pressure to the strip to rupture the membrane of the reservoir, thereby assuring release of the diffusion agent. The dams 27, however, prevent such diffusion agent from immediately being transmitted to the indication area, i.e., the wickable material underneath the windows 21. Thus, time is provided for application of the indicators to the desired packages and later freezing of the same. It will be recognized, that once the diffusion agent is frozen, wicking action thereof will be prevented.

Figure 4:
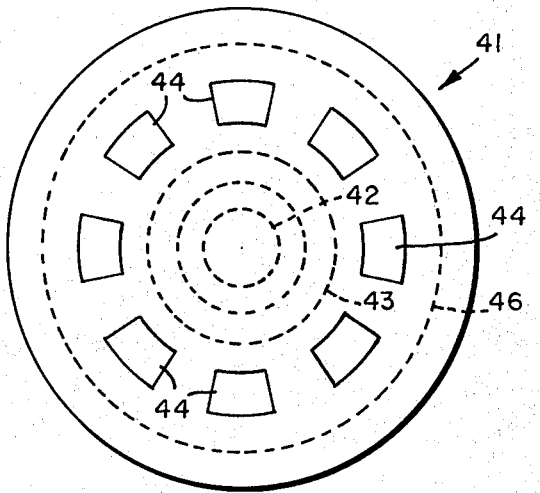
FIG. 4 is an enlarged, plan view of another preferred embodiment of the invention.

Although the features of the invention are illustrated embodied in a rectangular indictor, it will be recognized that the invention is applicable to various other configurations as well. In this connection, FIG. 4 illustrates a plan view of a circular indicator embodiment of the invention. With reference to such figure, the reservoir of such device 41 is located centrally therewithin as indicated at 42. Rather than the dams being provided by two linear compressions on opposite sides of the reservoir as in the previously described embodiment, only one, circular dam as indicated at 43 is provided. Such dam 43 circumscribes the reservoir 42 to isolate it from the windows 44 positioned in a circle on the side of such dam opposite of the reservoir. It will be recognized that this embodiment of the invention also includes a wickable material, the outer peripheral edge of which is indicated by the dotted line 46.

Figure 5:
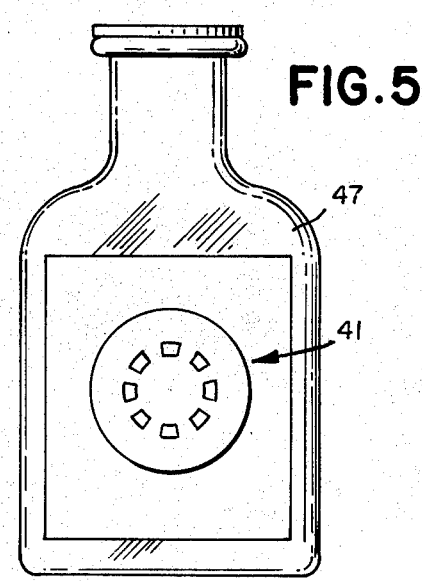
FIG. 5 is an elevation view of a package of frozen vaccine, for example, illustrating the embodiment of FIG. 4 secured thereto.

The embodiment of the invention shown in FIG. 4 is in all other respects basically the same as the embodiment shown in FIGS. 1 through 3. In this connection, indicator 41 can be also combined with a backing sheet if desired. FIG. 5 illustrates an indicator 41 applied to a bottle 47 for a frozen product, e.g., a vaccine or plasma.

Although the invention has been described in connection with preferred embodiments thereof, it will be appreciated by those skilled in the art that various changes and modifications can be made without departing from its spirit. For example, in certain instances it may be desirable to secure a plurality of indicators of the invention to one package, which insulators are designed to be responsive at different temperatures and times so that the thermal history of the product can be more accurately determined. Because of this and other changes, additions or modifications which can be made, it is intended that the coverage afforded applicant be limited only by the language of the claims and its equivalent.

I claim:

1. A device for indicating whether or not a product has been subjected to a temperature greater than a prescribed temperature for more than a predetermined period of time comprising: a housing having an indication area at a first location therein; a diffusion agent; a reservoir for said diffusion agent within said housing at a second location spaced from said first location; a wick for said diffusion agent extending between said first and second locations within said housing, said diffusion agent being capable of diffusion through said wick only when the temperature of said agent is above said prescribed temperature; said housing including a thermal conducting wall portion providing thermal communication between said product and the interior of said housing, and a thermal insulating wall portion substantially isolating the interior of said housing from the ambient temperature around said product, said thermal insulating wall portion including both a heat reflective surface and a material of lower heat conductivity than said reflective surface and said thermal conducting wall portion; and an adhesive covering substantially the full external surface area of said thermal conducting wall portion for adhering substantially said full surface area to said product in good heat transfer contact therewith.

2. The device of claim 1 wherein a dam is provided across said wick at a location between said reservoir and said indication area for controlling diffusion of said agent therebetween.

3. The device of claim 2 wherein said reservoir is a closed membrane rupturable from exteriorly of said housing to release said diffusion agent therefrom for contact with said wick at the time it is desired to activate said device.

4. The device of claim 2 wherein said wick is of a generally porous material and said dam includes a portion of said material which is of increased density to reduce the time rate of diffusion of said agent through said portion.

5. The device of claim 4 wherein said wick is of a cellulosic material, and said dam includes a portion thereof which is compressed to reduce the rate of diffusion therethrough.

6. The device of claim 1 wherein both said thermal conducting wall portion of said heat reflective surface at the thermal insulating wall portion are provided by a metal foil layer.

7. The device of claim 6 wherein said diffusion agent is of a different color than said wick, and said housing includes a light transmission window at the location of said indication area, whereby the presence of said diffusion agent at said indication area is visually detectable from the exterior of said housing as a color change.

8. The device of claim 7 wherein said wick is of a generally porous material and a dam which includes a portion of said material of increased density to reduce the time rate of flow of diffusion of said agent thereat extends across said wick at a location between said reservoir and said light transmission window.

9. The device of claim 8 wherein said reservoir is a closed membrane rupturable from exteriorly of said housing to release said diffusion agent therefrom for contact with said wick at the time it is desired to activate said device.

10. The device of claim 6 wherein both said wick and said reservoir are in direct thermal contact with said thermal conducting wall portion.

11. The device of claim 10 wherein said material of lower heat conductivity of said thermal insulating wall portion is of a transparent synthetic plastic material forming the outermost layer of said insulating wall portion and said reflective surface is provided by a metal foil inwardly of said synthetic plastic material having at least one window opening at said indication area allowing visual inspection of the interior of said housing thereat from its exterior.

12. The device of claim 1 wherein said material of lower heat conductivity of said thermal insulating wall portion is of a transparent synthetic plastic material forming the outermost layer of said insulating wall portion and said reflective surface is provided by a metal foil inwardly of said synthetic plastic material having at least one window opening at said indication area allowing visual inspection of the interior of said housing thereat from its exterior.

13. A process for activating a device for indicating whether or not a product has been subjected to a temperature greater than a prescribed temperature for more than a predetermined period of time comprising the steps of providing a thermal indicating device which includes a housing containing a closed reservoir of a diffusion agent which is flowable only above said prescribed temperature and a wick for said diffusion agent extending between said reservoir and an indication area, rupturing said reservoir from externally of said housing to release said diffusion agent prior to preventing flow thereof by lowering the temperature thereof below said prescribed temperature, and applying said device to said product.

14. The method of claim 13 wherein said step of rupturing said reservoir includes passing a continuous strip of serially connected identical ones of said devices between a pair of pinch rollers spaced apart a distance small enough to rupture the reservoirs contained respectively therein; and said step of applying said device includes separating the individual devices from said strip after the same have passed through said rollers.

* * * * *